(12) United States Patent
Khosravani

(10) Patent No.: US 10,894,612 B2
(45) Date of Patent: Jan. 19, 2021

(54) INTERDIGITATED HEATING PROBE

(71) Applicant: The Boeing Company, Chicago, IL (US)

(72) Inventor: Shahriar Khosravani, Everett, WA (US)

(73) Assignee: The Boeing Company, Chicago, IL (US)

( * ) Notice: Subject to any disclaimer, the term of this patent is extended or adjusted under 35 U.S.C. 154(b) by 184 days.

(21) Appl. No.: 16/005,301

(22) Filed: Jun. 11, 2018

(65) Prior Publication Data
US 2019/0375515 A1 Dec. 12, 2019

(51) Int. Cl.
*H05B 1/02* (2006.01)
*B64D 45/02* (2006.01)
*B29C 35/02* (2006.01)

(52) U.S. Cl.
CPC .............. *B64D 45/02* (2013.01); *B29C 35/02* (2013.01); *B29C 2035/0211* (2013.01)

(58) Field of Classification Search
CPC ..... B64D 45/02; B29C 35/02; B29C 35/0211; H05B 1/02; H05B 3/0014; H05B 3/0038; H05B 3/026; H05B 3/023; H05B 2203/006
USPC ................ 219/494, 482, 483, 486, 539, 537
See application file for complete search history.

(56) References Cited

U.S. PATENT DOCUMENTS

| | | | | |
|---|---|---|---|---|
| 4,100,332 A | * | 7/1978 | Carr .................... | H01M 8/2455 429/210 |
| 4,828,770 A | * | 5/1989 | Fabian .................. | B29C 48/10 264/40.3 |
| 10,256,507 B1 | * | 4/2019 | Busacca ................ | H01M 2/14 |
| 2018/0136266 A1 | * | 5/2018 | Ho ........................ | G01R 27/14 |

* cited by examiner

*Primary Examiner* — Mark H Paschall
(74) *Attorney, Agent, or Firm* — McDonnell Boehnen Hulbert & Berghoff LLP

(57) ABSTRACT

The present disclosure relates systems and methods for treating various materials, such as carbon fiber reinforced polymer (CFRP), with a Joule heating process so as to reduce or eliminate a risk of sparks or explosion due to lightning strikes. The disclosure also relates to an aircraft component with structures that have undergone a Joule heating process by way of the systems and methods described herein. An example method includes providing an electrode array having a first and second electrode set. Each of the electrode sets includes one or more disk-shaped electrodes that are arranged in an interdigitated, concentric stack about a central axis. The method also includes causing the electrode array to contact a conductive material. The method additionally includes causing a current source to provide electrical current through the first electrode set and the second electrode set so as to heat at least a portion of a conductive material.

20 Claims, 14 Drawing Sheets

INTERDIGITATED HEATING PROBE

FIELD

The present disclosure generally relates to systems that include an electrode array having a plurality of interdigitated electrodes and a current source configured to provide an electrical current to the electrodes so as to provide Joule heating. Related methods involve causing the electrode array to contact a conductive material and causing the current source to provide electrical current so as to heat a portion of the conductive material. Furthermore, the present disclosure may relate to aircraft and/or aircraft components with carbon fiber reinforced polymer structures treated by a Joule heating process as described herein.

BACKGROUND

Composite materials can offer improved strength-to-weight among other benefits over conventional bulk materials, such as steel and aluminum. However, some composite materials, such as multi-ply carbon fiber reinforced polymer (CFRP), can exhibit anisotropic conductivity and/or low conductivity compared to bulk metals. As such, structures formed of such materials can be more susceptible to damage due to lightning strikes and other electrical phenomena. Currently, existing lightning protections focus on containment of sparks (cap seals) or increasing conductivity (via fastener sleeves, conductive hole filling and or conductive fasteners) in materials. However, existing solutions generally do not focus on treating the structure for eliminating the volatile material inside the hole which is the primary cause of the spark.

SUMMARY

In an aspect, a system is described. The system includes an electrode array including a first electrode set and a second electrode set. The first electrode set and the second electrode set each include one or more disk-shaped electrodes. Respective electrodes of the first electrode set and the second electrode set are arranged in an interdigitated, concentric stack about a central axis. The system also includes a current source. A first terminal of the current source is electrically-coupled to the first electrode set and a second terminal of the current source is electrically-coupled to the second electrode set. The system additionally includes a controller. The controller is configured to cause the current source to provide electrical current through the first electrode set and the second electrode set so as to heat at least a portion of a conductive material present between an outer edge of at least one electrode of the first electrode set and an outer edge of at least one electrode of the second electrode set.

In a further aspect, a method is described. The method includes providing an electrode array. The electrode array includes a first electrode set and a second electrode set. The first electrode set and the second electrode set each include one or more disk-shaped electrodes. Respective electrodes of the first electrode set and the second electrode set are arranged in an interdigitated, concentric stack about a central axis. The first electrode set is electrically-connected to a first terminal of a current source. The second electrode set is electrically-connected to a second terminal of the current source. The method also includes causing the electrode array to contact a conductive material such that the conductive material is in contact with an outer edge of at least one electrode of the first electrode set and an outer edge of at least one electrode of the second electrode set. The method additionally includes causing the current source to provide electrical current through the first electrode set and the second electrode set so as to heat at least a portion of a conductive material.

In a further aspect, an aircraft component is described. The aircraft component includes structures including carbon fiber reinforced polymer (CFRP). The structures include holes in the CFRP. The holes have been treated by a Joule heating process. The Joule heating process includes providing an electrode array. The electrode array includes a first electrode set and a second electrode set. The first electrode set and the second electrode set each include one or more disk-shaped electrodes. Respective electrodes of the first electrode set and the second electrode set are arranged in an interdigitated, concentric stack about a central axis. The first electrode set is electrically-connected to a first terminal of a current source. The second electrode set is electrically-connected to a second terminal of the current source. The Joule heating process also includes causing the electrode array to contact the CFRP such that at least a portion of the CFRP is in contact with an outer edge of at least one electrode of the first electrode set and an outer edge of at least one electrode of the second electrode set. The Joule heating process additionally includes causing the current source to provide electrical current through the first electrode set and the second electrode set so as to heat at least the portion of the CFRP.

Other aspects, examples, and implementations will become apparent to those of ordinary skill in the art by reading the following detailed description with reference, where appropriate, to the accompanying drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

I. Overview

Figure 1:
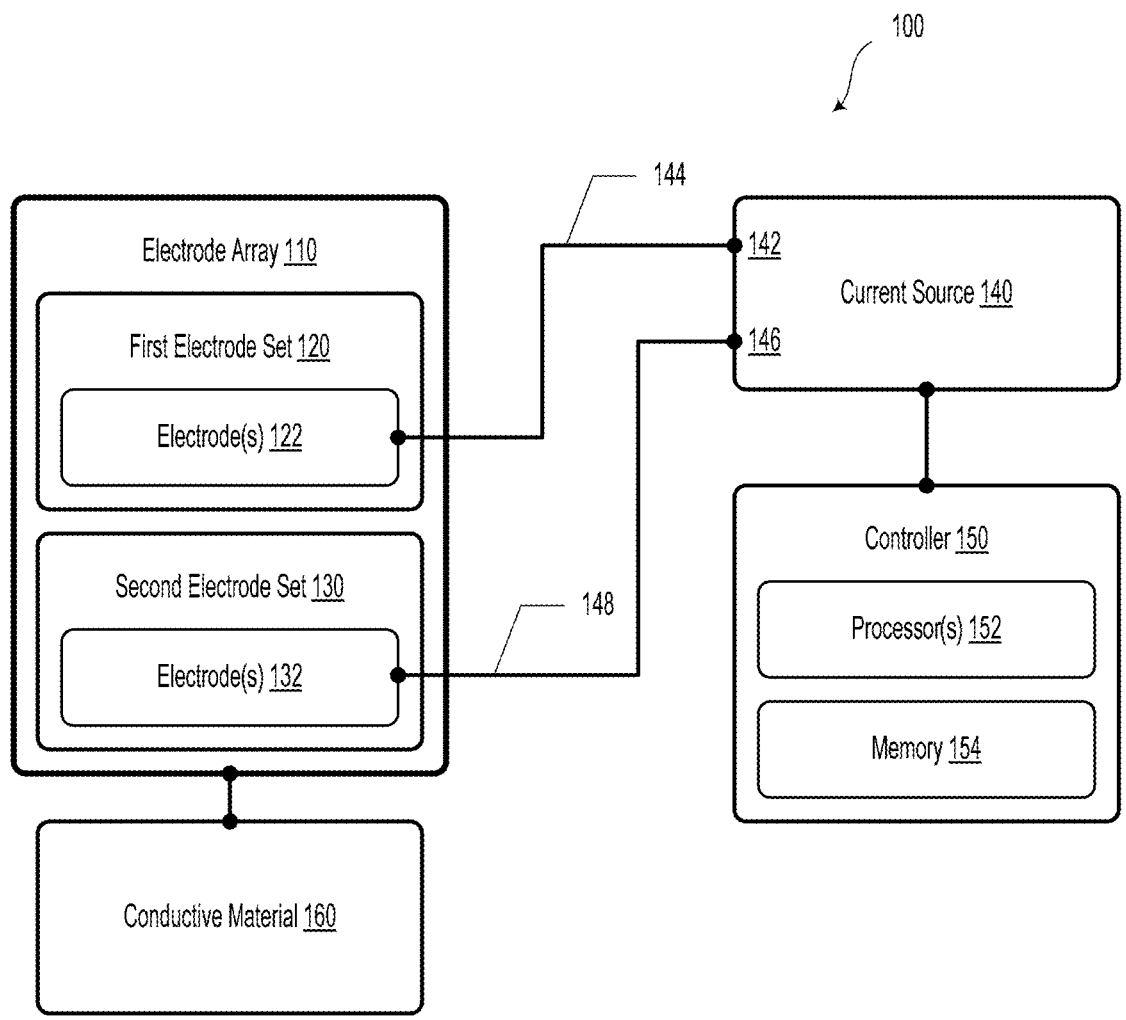
FIG. 1 illustrates a system, according to an example implementation.

Example methods, devices, and systems are described herein. It should be understood that the words "example" and "exemplary" are used herein to mean "serving as an example, instance, or illustration." Any example or feature described herein as being an "example" or "exemplary" is not necessarily to be construed as preferred or advantageous over other examples or features. Other examples can be utilized, and other changes can be made, without departing from the scope of the subject matter presented herein.

Thus, the examples described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall examples, with the understanding that not all illustrated features are necessary for each example.

The present disclosure provides systems and methods for eliminating/vaporizing a small portion of resin between plys of CFRP. In some cases, each ply of CFRP could include a plurality of fibers coupled together in a resin matrix. Each fiber could be approximately 5.5 microns thick. Eliminating the resin in such areas may modify the conductivity so as to make it more isotropic and/or increase conductivity. Such treatments may reduce or eliminate the chance for sparks or other lightning effects. Accordingly, treatments would eliminate the need for sleeved fasteners, cap seals, and other hole treatments, thus reducing weight and manufacturing time. Moreover, this technology would remove the need for additional hole preparation such as deburring, as material created by this apparatus (carbon) is removed and serves as a lubricant.

An interdigitated heating probe system includes an electrode array, a current source, and a controller. The electrode array includes two sets of interdigitated electrodes, each set of electrodes being connected to a respective terminal of the current source. The respective electrodes of the electrode array are disk-shaped and are arranged in a concentric stack about a central axis.

The controller could be configured to cause the current source to provide electrical current through the first and second electrode set when a conductive material is placed near, and/or in contact with, respective outer edges of adjacent (e.g., nearest-neighbor) electrodes within the stack of electrodes in the electrode array. The electrical current may cause Joule heating in the conductive material sufficient to change its properties.

In the case of CFRP material, at least a portion of resin between the carbon fiber plys may be vaporized or eliminated in response to heating. Furthermore, such Joule heating may cause the treated portion of CFRP to become more conductive. In use, the electrode array may be inserted into a hole formed in CFRP material so as to form a continuously-conductive inner surface of the hole.

In some embodiments, by the processes of electrical Joule heating and pyrolyzation, the interdigitated heating probe system can convert the resin matrix along the inner wall surface of the CFRP to carbon and/or other byproducts. The pyrolyzation process can affect the resin matrix within a distance comparable to the ply thickness, which may be between 7.8-8.0 mils or approximately 200 microns.

II. Example Systems

FIG. 1 illustrates a system 100, according to an example implementation. The system 100 includes an electrode array 110. The electrode array 110 includes a first electrode set 120 and a second electrode set 130. The first electrode set 120 and the second electrode set 130 each include one or more electrodes 122 and 132. The respective electrodes (e.g., electrodes 122 and 132) of the first electrode set 120 and the second electrode set 130 are arranged in an interdigitated, concentric stack about a central axis.

The system includes a current source 140. A first terminal 142 of the current source 140 is electrically-coupled to the electrode(s) 122 of the first electrode set 120. A second terminal 146 of the current source 140 is electrically-coupled to the electrode(s) 132 of the second electrode set 130. In an example embodiment, the first terminal 142 could be coupled to the electrodes 122 via a first bus connection 144. Furthermore, the second terminal 146 could be coupled to the electrodes 132 via a second bus connection 148.

While FIG. 1 illustrates a current source 140, it will be understood that another type of controllable power supply (e.g., voltage supply) may be utilized in lieu, or in addition to, a current source. As an example, current source 140 could include a steady-state (e.g., direct current, DC) power supply. Additionally or alternatively, current source 140 could include an alternating current (AC) power supply that may provide an AC voltage or current at one or more frequencies (e.g., 60 Hz).

The system 100 includes a controller 150. The controller 150 may include one or more processors 152 and at least one memory 154. The processor 152 may include, for instance, a microprocessor, an application-specific integrated circuit (ASIC), or a field-programmable gate array (FPGA). Other types of processors, circuits, computers, or electronic devices configured to carry out software instructions are contemplated herein.

The memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The one or more processors 152 of controller 150 may be configured to execute instructions stored in the memory 154 so as to carry out various operations and method steps/blocks described herein. The instructions may be stored in a permanent or transitory manner in the memory 154.

In an example embodiment, The controller 150 could execute instructions relating to operations such as causing the current source 140 to provide electrical current through the first electrode set 120 and the second electrode set 130 so as to heat at least a portion of a conductive material 160 present between an outer edge of at least one electrode 122 of the first electrode set 120 and an outer edge of at least one electrode 132 of the second electrode set 130.

Figure 2:
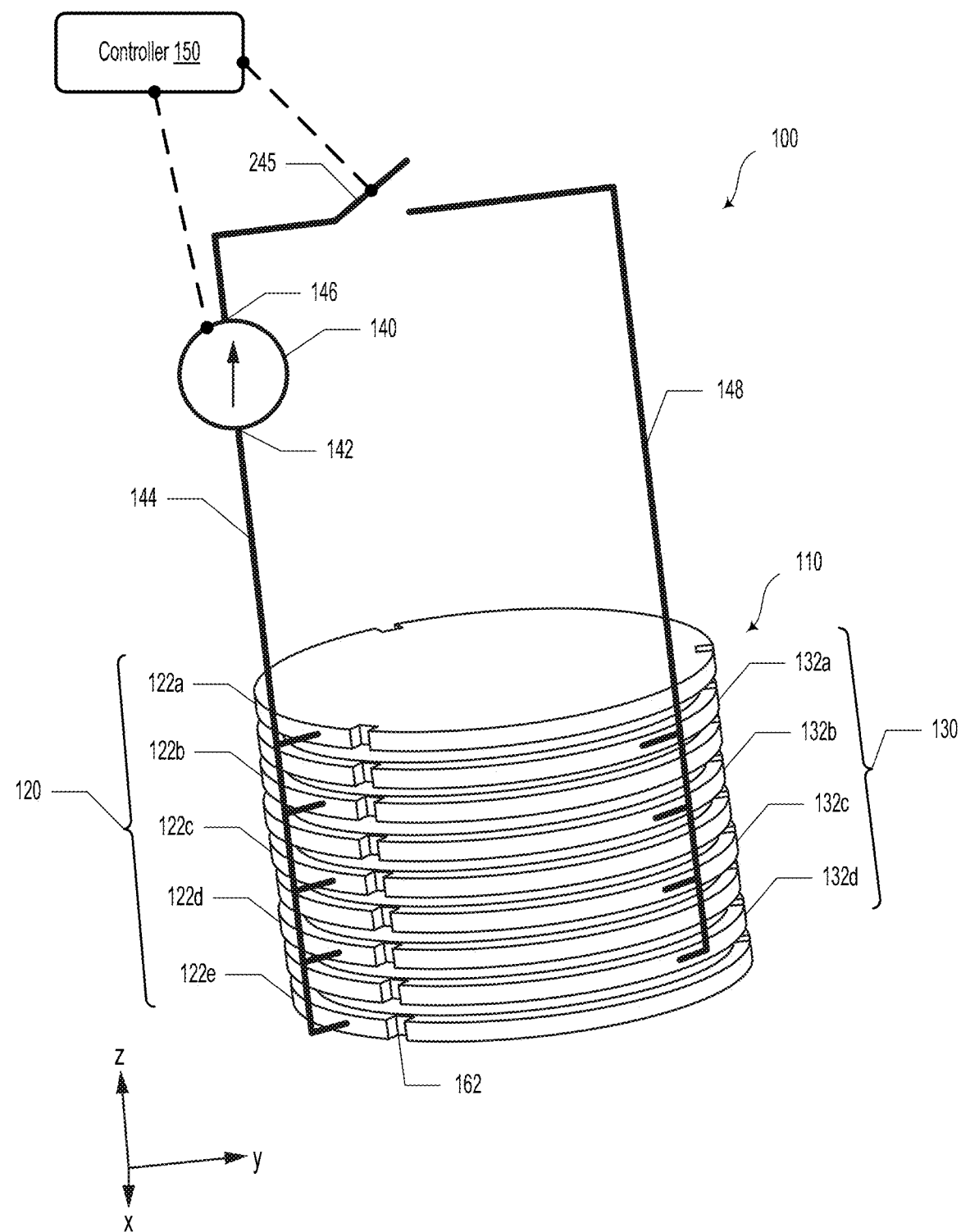
FIG. 2 illustrates a system, according to an example implementation.

FIG. 2 illustrates a system 100, according to an example implementation. System 100 or elements thereof could be similar or identical to corresponding elements as illustrated and described in reference to FIG. 1. As illustrated in FIG. 2, the system 100 could include a plurality of electrodes (e.g., electrodes 122a-e and 132a-d) arranged in an interdigitated, concentric stack forming the electrode array 110. Namely, the electrode array 110 could include an alternating stack of the respective electrodes of the first electrode set 120 and the second electrode set 130. Each electrode (e.g., electrode 122b) of the first electrode set 120 is immediately adjacent to at least one electrode (e.g., electrodes 132a and 132b) of the second electrode set 130, and vice versa.

The physical spacing between adjacent electrodes in the stack could be based on a ply thickness of a CFRP material. For example, in some embodiments, respective plys of CFRP could be approximately 200 microns thick. Accordingly, adjacent electrodes could be separated by a distance of approximately 200 microns. However, it will be understood that other distances between adjacent electrodes are contemplated and possible. As described herein, the adjacent electrodes could be separated by an electrically-insulating material, such as air, polyethylene, polystyrene, biaxially-oriented polyethylene terephthalate, and/or polytetrafluoroethylene.

In various embodiments, the respective electrodes could include at least one of steel or titanium. In some embodiments, the electrodes could include a composite structure (e.g., a steel center portion and a titanium edge portion). The composite structure could include the respective electrodes having two or more layers. For example, each electrode could include a layer of steel "sandwiched" between two layers of titanium. Other composite arrangements and/or material combinations are contemplated.

In some embodiments, the electrodes could be formed using additive manufacturing techniques. Other ways to form the electrodes are contemplated and possible.

Additionally or alternatively, the electrodes could be coated with one or more materials to improve structural and/or electrical properties. For instance, the electrodes could be coated with various conductive materials such as titanium, gold, platinum, and/or silver, among others. In some embodiments, the electrodes could be partially or entirely coated with coatings that could improve the hardness and/or durability of the electrodes, such as a silicon nitride or silicon dioxide coating. It will be understood that other electrode materials and coatings are contemplated within the scope of the present disclosure.

In some embodiments, a first bus connection 144 could be configured to electrically couple the first electrode set 120 to a first terminal 142 of the current source 140. A second bus connection 148 could be configured to electrically couple the second electrode set 130 to a second terminal 146 of the current source 140. In such scenarios, a switching element 245 could be placed in series with the first bus connection 144 and/or the second bus connection 148. The switching element 245 could be configured to controllably open and/or close a circuit so as to allow electrical current to flow.

In example embodiments, controller 150 could be configured to control the switching element 245 and/or the current source 140. For example, the controller 150 could open or close the switching element 245 and/or control a desired current or voltage provided by the current source 140. In some embodiments, the switching element 245 could include a pressure switch that may be triggered upon inserting the electrode array into a hole. As such, the switching element 245 could be more user-friendly than a system requiring a button, trigger, or another type of user input.

In some embodiments, some or all of the electrodes 122a-e and 132a-d could include at least one axial vent opening 162. In such scenarios, the at least one axial vent opening 162 could include a notch along an outer edge of the respective electrode. The at least one axial vent opening 162 may provide an opening for gases to vent when materials are treated using the Joule heating process described herein. Furthermore, the axial vent opening 162 could provide an opening for particles to be vacuumed from the hole and/or surface before or while being treated using the Joule heating process. Additionally or alternatively, the axial vent opening 162 could provide increased mechanical flexibility to accommodate, for example, rough hole openings and/or rough surfaces. While FIG. 2 illustrates the axial vent opening 162 as being a notch, other types of openings in the electrode are possible and contemplated so as to permit gases and/or solids to move through and/or around the electrode array 110. As an example, the axial vent opening 162 could include one or more holes in the electrode.

In some embodiments, each electrode of the first electrode set 120 and the second electrode set 130 include a plurality of axial vent openings 162 spaced at regular angular intervals. For example, as illustrated in FIG. 2, the respective electrodes could each have three axial vent openings angularly spaced apart by 120 degrees. Furthermore, in some embodiments include a relative position of the axial vent openings of the first electrode set 120 being different in radial angle from those of the second electrode set 130. That is, the axial vent openings of the electrodes of the first electrode set 120 could be offset in angle by 60 degrees as compared to the axial vent openings of electrodes of the second electrode set 130. Other arrangements of the axial vent openings are possible and contemplated.

Figure 3:
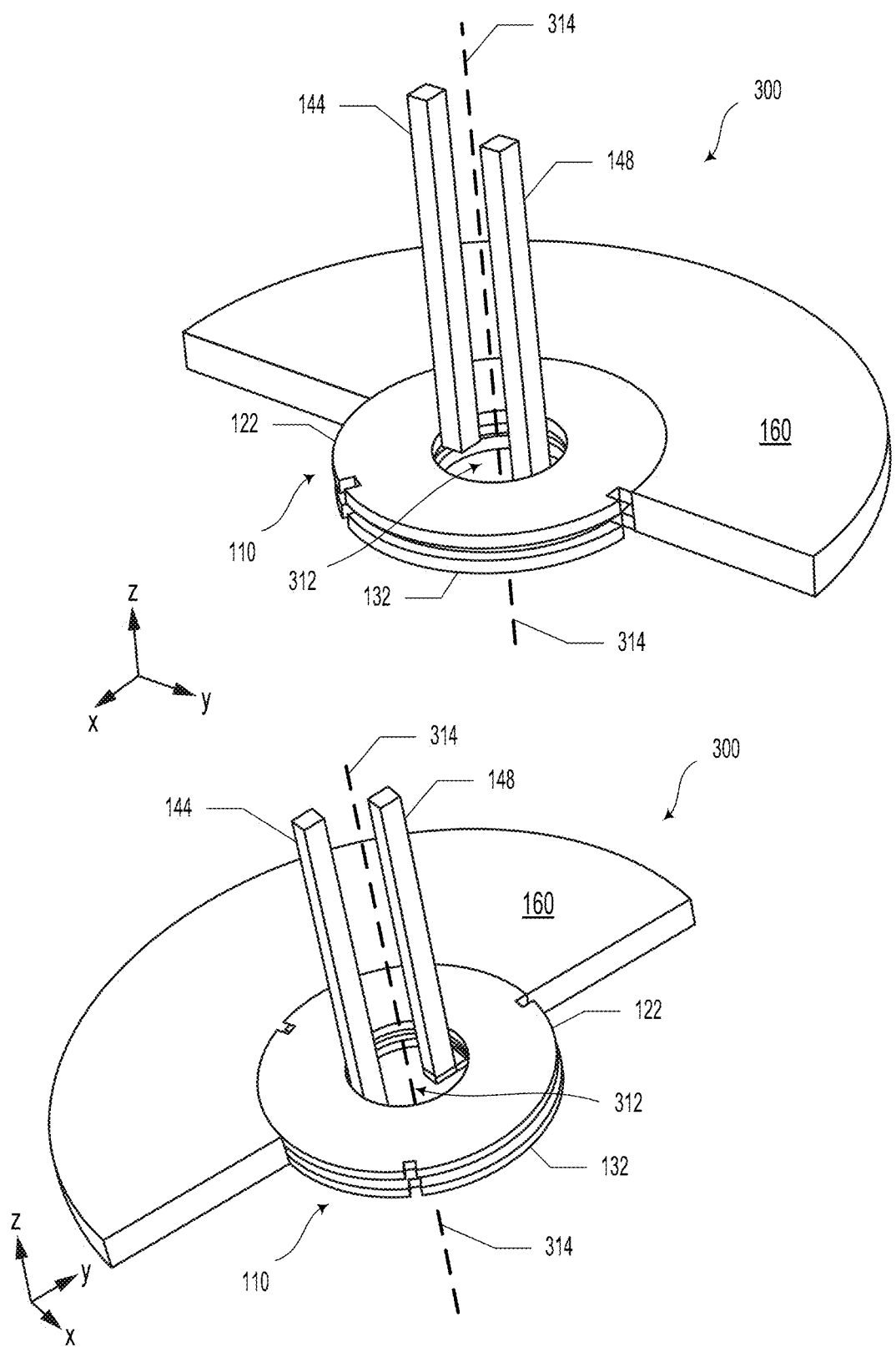
FIG. 3 illustrates an electrode array interacting with a conductive material, according to an example implementation.

FIG. 3 illustrates a scenario 300 that includes two different views of an electrode array 110 interacting with a conductive material 160, according to an example implementation. Elements in FIG. 3 could be similar or identical to similar elements described and illustrated in reference to FIGS. 1 and 2. As illustrated in FIG. 3, the electrode array 110 could include a first electrode 122 and a second electrode 132. The respective electrodes may both include a central opening 312. In such a scenario, the central opening 312 could be arranged about a central axis 314.

Additionally or alternatively, the electrode array 110 could also include a first bus connection 144 and a second bus connection 148. In such a scenario, the first bus connection 144 provides an electrical connection between first electrode 122 and a first terminal of a current source (e.g., current source 140 as illustrated and described in reference to FIGS. 1 and 2) through the central opening 312. The second bus connection 148 provides an electrical connection between the second electrode 132 and a second terminal of the current source through the central opening 312. It will be understood that while, as illustrated, the electrode array 110 includes only two electrodes (e.g., first electrode 122 and second electrode 132), more electrodes are possible. Thus, the first bus connection 144 could connect to a first electrode set and the second bus connection 148 could connect to a second electrode set, each electrode set having a respective plurality of electrodes.

In some embodiments, such a plurality of electrodes could be stacked in an interdigitated arrangement. That is an electrode of the first electrode set could be stacked between at least one electrode of the second electrode set. In such a scenario, the first bus connection 144 could be connected to the "odd" positioned electrodes in the electrode stack and the second bus connection 148 could be connected to the "even" positioned electrodes in the electrode stack. Other arrangements of electrodes, electrical busses, and/or electrical connections are possible and contemplated herein.

Figure 4:
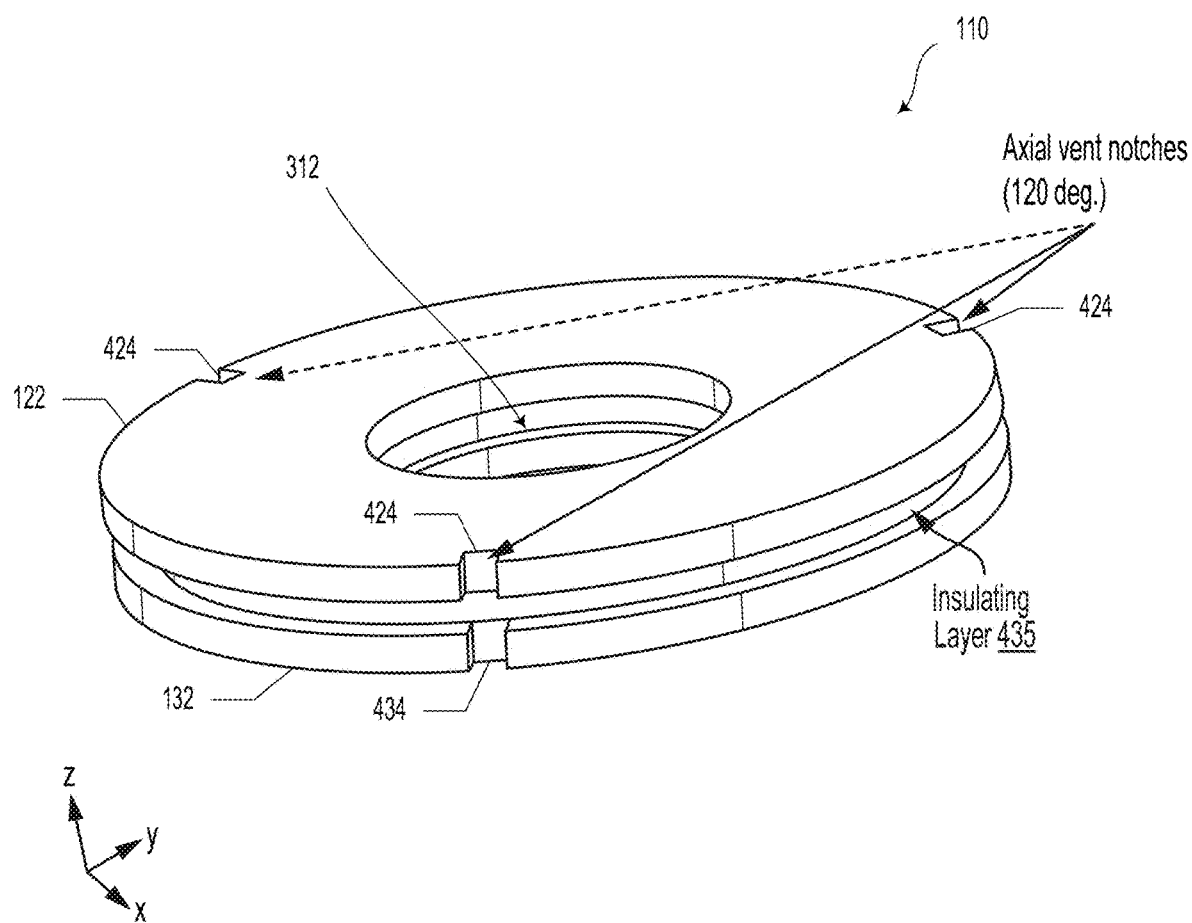
FIG. 4 illustrates an electrode array, according to an example implementation.

FIG. 4 illustrates an electrode array 110, according to an example implementation. Electrode array 110 could be similar or identical to similar elements as illustrated and described in reference to FIGS. 1, 2, and 3, respectively.

Electrode array 110 includes a first electrode 122 and a second electrode 132, which may both include a central opening 312. Additionally or alternatively, the first electrode 122 could include a plurality of axial vent openings 424 and the second electrode 132 could include a plurality of axial vent openings 434. As illustrated in FIG. 4, the axial vent openings 424 and 434 could occur along an outer edge of the first electrode 122 and the second electrode 132 at an angular spacing of 120 degrees with respect to a common central axis. It will be understood that other arrangements and/or angular spacings between axial vent openings are possible and contemplated.

The electrode array 110 also includes an insulating layer 435 that may be arranged between the first electrode 122 and the second electrode 132. While FIG. 4 illustrates only first electrode 122 and second electrode 132, it will be understood that the electrode array 110 could include more electrodes. In such scenarios, respective insulating layers 435 could be arranged between each adjacent electrode so as to prevent a short circuit between electrodes and/or to provide structural support for the electrode array 110.

Namely, in example embodiments, neighboring electrodes of the electrode array 110 could be separated by insulating layer 435. In such scenarios, the insulating layer 435 could include a thickness of at least 5 millimeters. Additionally or alternatively, insulating layer 435 could be thicker or thinner. In an example embodiment, the insulating layer 435 could include at least one of: air, polyethylene, polystyrene, biaxially-oriented polyethylene terephthalate, or polytetrafluoroethylene. Other types of insulating materials suitable for insulating layer 435 are possible and contemplated herein.

Figure 5A:
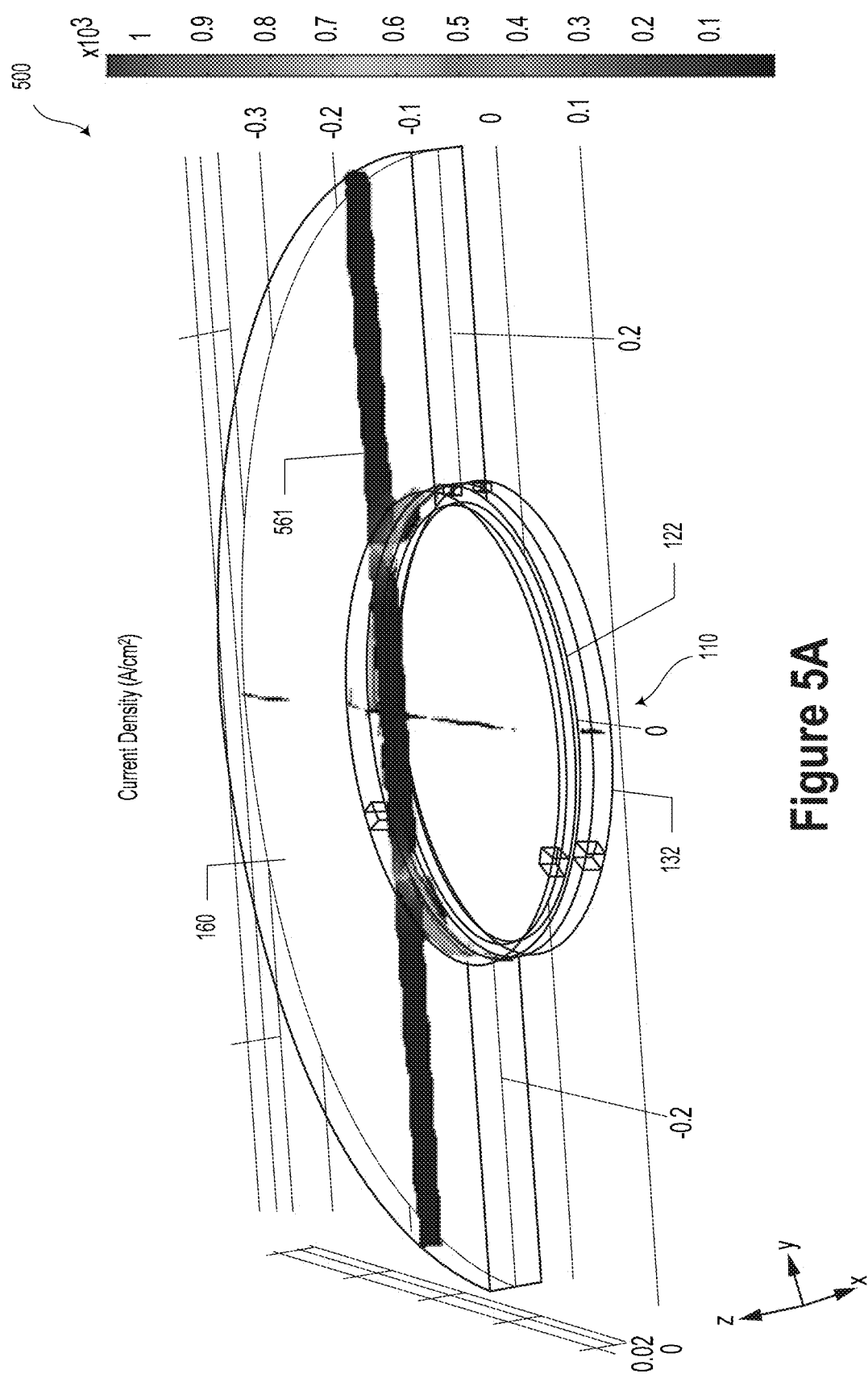
FIG. 5A illustrates current density within an electrode array and conductive material, according to an example implementation.
Figure 5B:
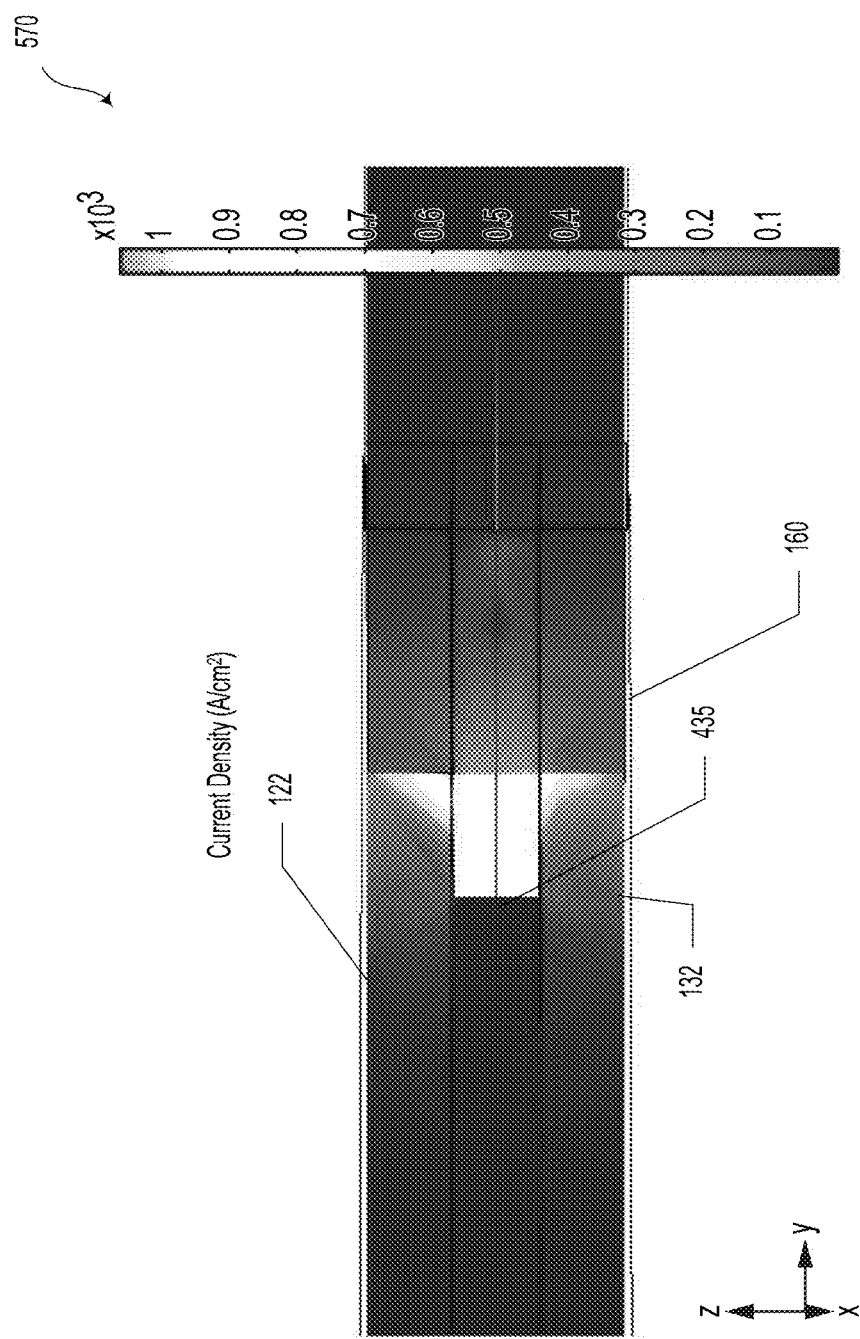
FIG. 5B illustrates current density within an electrode array and conductive material, according to an example implementation.
Figure 5C:
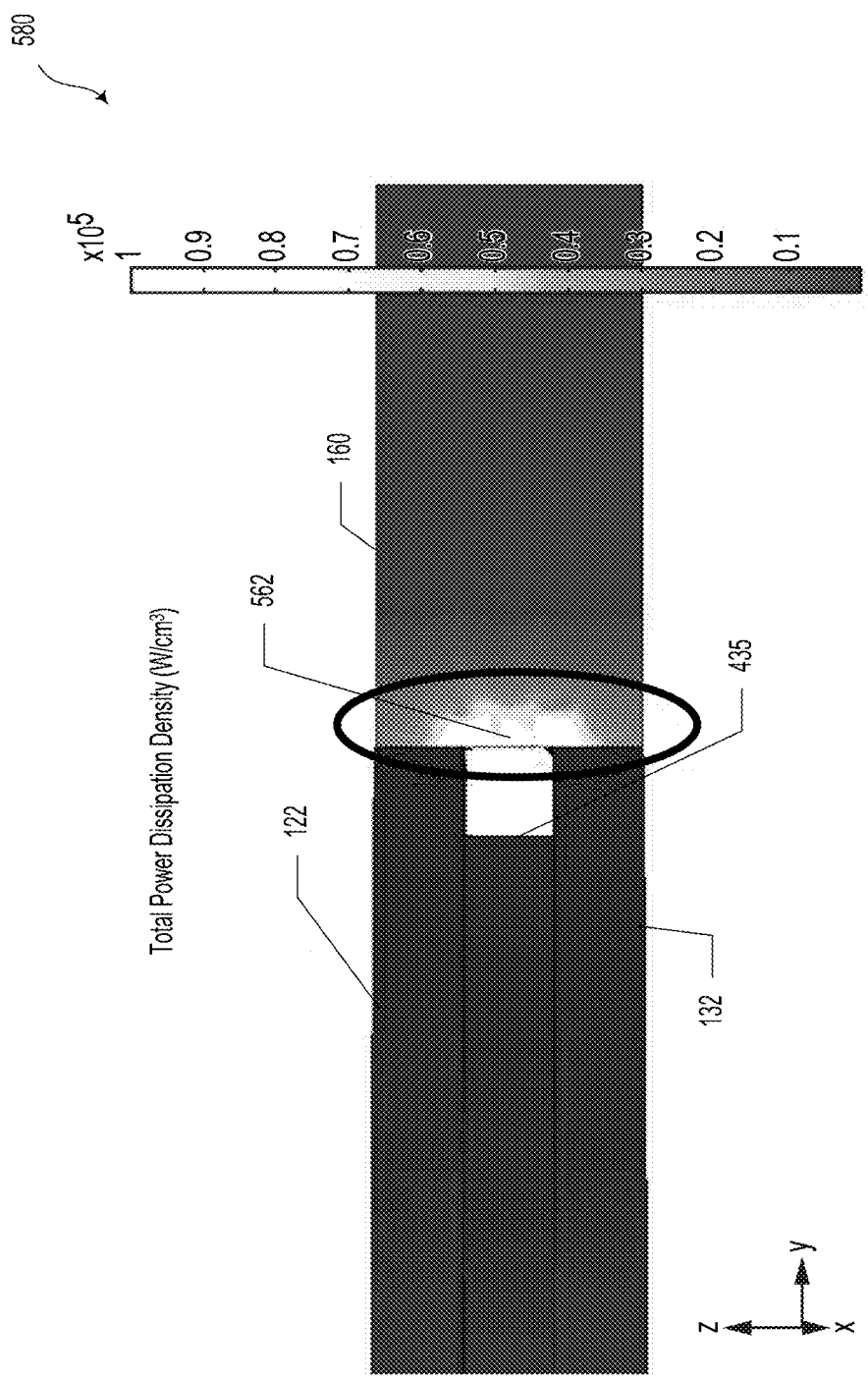
FIG. 5C illustrates power dissipation density within an electrode array and conductive material, according to an example implementation.

FIGS. 5A, 5B, and 5C illustrate finite element simulations under various conditions. FIG. 5A illustrates current density information 561 in units of A/cm$^2$ for a scenario 500 that includes an electrode array 110 and conductive material 160, according to an example implementation. The electrode array 110 could include a first electrode 122 and a second electrode 132. The electrode array 110 could include similar or identical elements as illustrated and described in reference to FIGS. 1, 2, 3, and 4.

FIG. 5B illustrates current density information in units of A/cm$^2$ for a scenario 570 that includes a first electrode 122, a second electrode 132, and a conductive material 160, according to an example implementation. The first electrode 122 and the second electrode 132 could be separated by an insulating layer 435.

FIG. 5C illustrates power dissipation density in units of W/cm$^3$ for a scenario 580 that includes a first electrode 122, a second electrode 132, an insulating layer 435, and conductive material 160, according to an example implementation. The data indicate a zone 562 of relatively higher power dissipation. Zone 562 could include an area or volume of the conductive material 160 along or through which electrical current may pass. Due to the power dissipated in the zone 562, a localized surface or volume of the conductive material 160 may be heated, which may in turn, cause changes in its material properties.

Namely, as described herein, the conductive material 160 could include carbon fiber reinforced polymer (CFRP) material. In such a scenario, causing a current source (e.g., current source 140 as illustrated and described in reference to FIGS. 1 and 2) to provide electrical current through the first electrode 122 and the second electrode 132 includes applying Joule heating to the CFRP material. Such Joule heating may vaporize or eliminate at least a portion of resin from the CFRP material present between an outer edge of the first electrode 122 and an outer edge of the second electrode 132 (e.g., within the zone 562). When applying such Joule heating to the CFRP material, a conductive surface could be formed along a surface of the CFRP material.

Figure 6A:
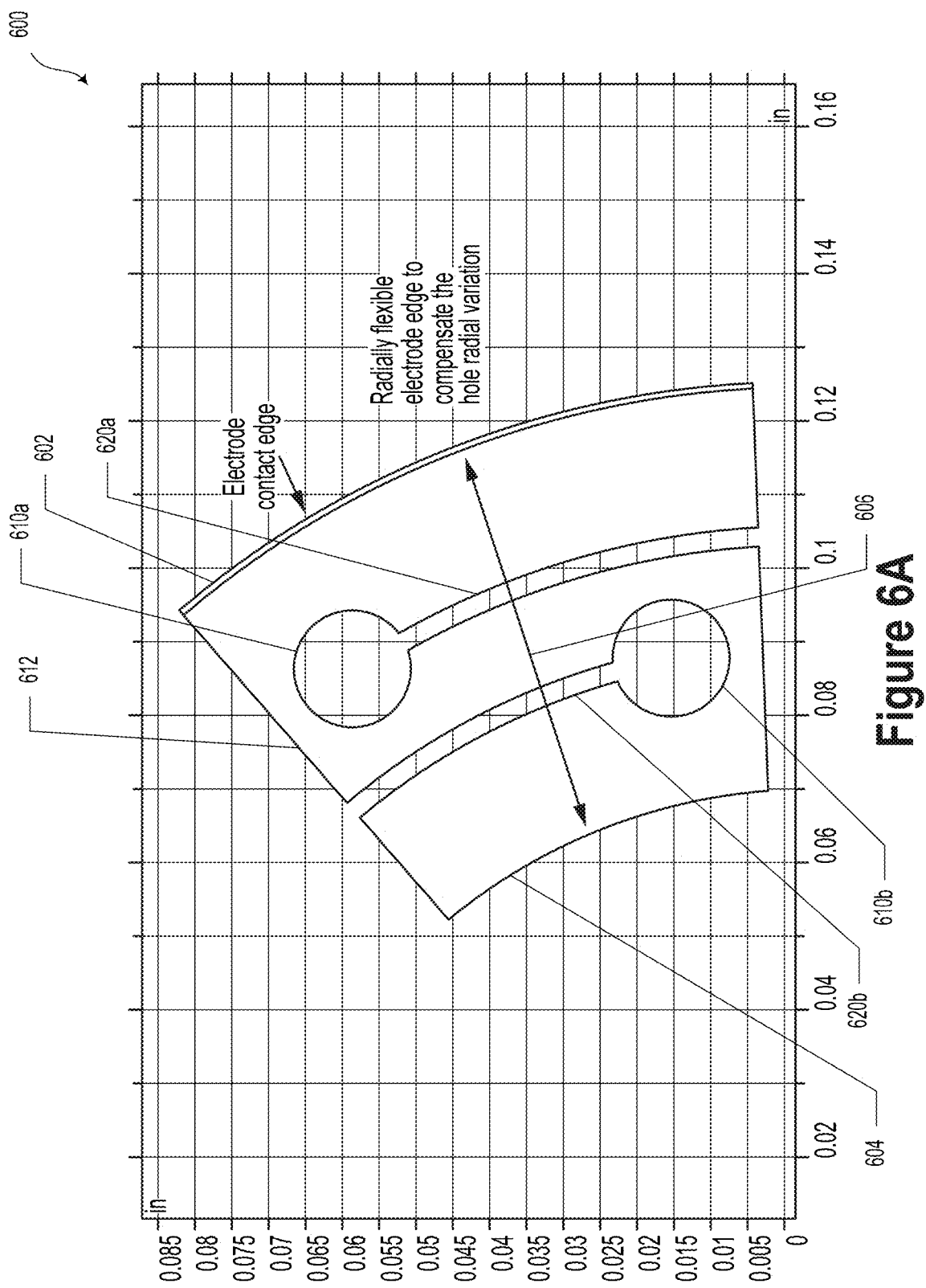
FIG. 6A illustrates a unit cell of an electrode, according to an example implementation.

FIGS. 6A, 6B, 6C, 6D, and 6E illustrate various views of electrodes, or unit cells thereof, having flexural hinges. FIG. 6A illustrates a unit cell 600 of an electrode 612, according to an example implementation. Electrode 612 could be similar or identical to other disk-shaped electrodes (e.g., electrodes 122, 132, 222a-e, 232a-d, etc.) described elsewhere herein. As illustrated in FIG. 6A, electrode 612 may include a plurality of planar flexural hinges. In example embodiments, the flexural hinges could be configured to allow a compressive movement of an outer edge 602 of the respective electrode with respect to the central axis or an inner edge 604 of the respective electrode. In some embodiments, each flexural hinge of the plurality of flexural hinges could include at least one circular opening 610a and 610b and at least one alley opening 620a and 620b.

Figure 6B:
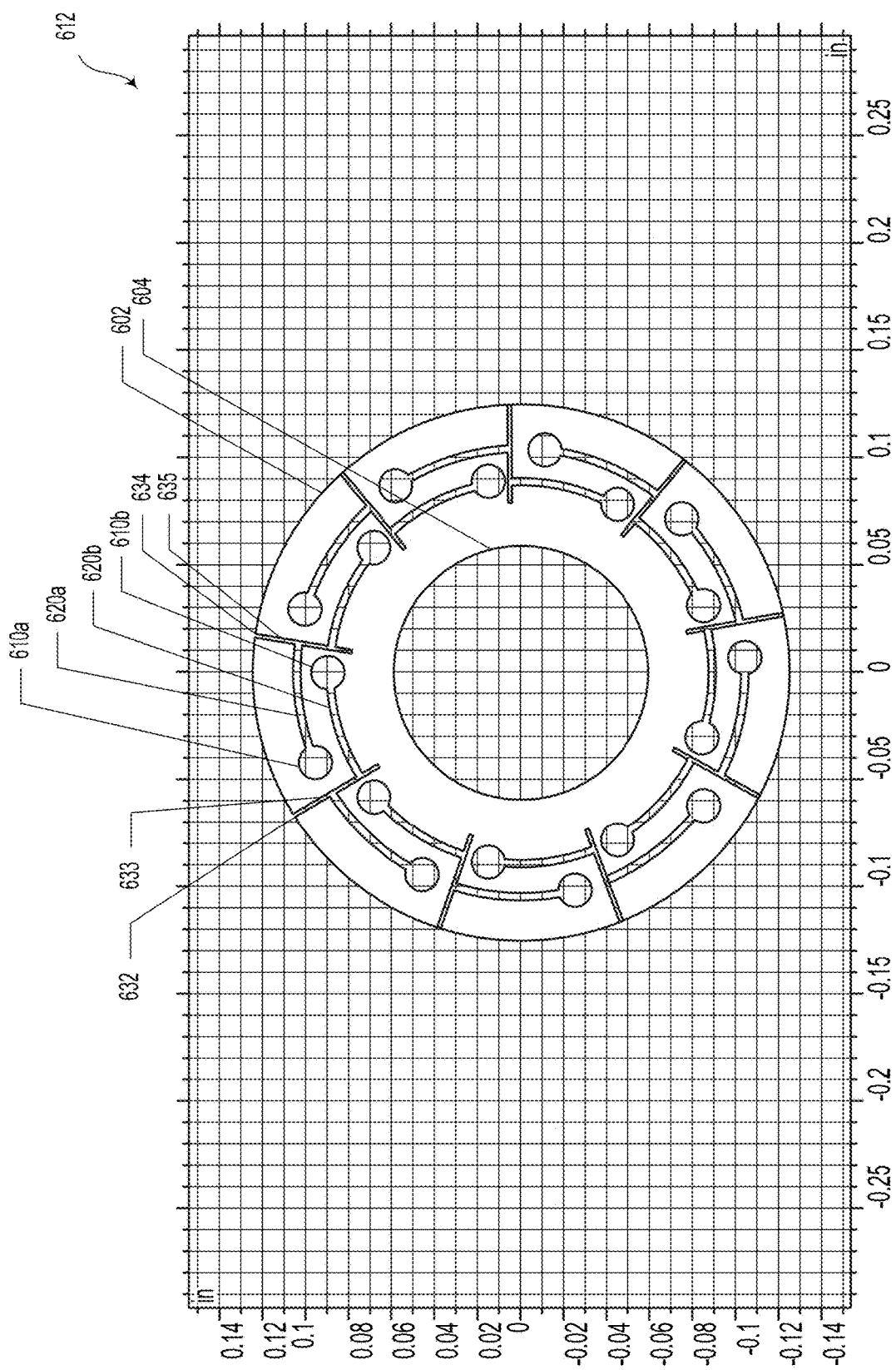
FIG. 6B illustrates an electrode, according to an example implementation.

FIG. 6B illustrates an electrode 612, according to an example implementation. Electrode 612 could include a plurality of unit cells 600 as illustrated and described in reference to FIG. 6A. Electrode 612 includes a plurality of axial vent openings (e.g., axial vent openings 632 and 634) connected to flexural hinges. The axial vent openings could include an axial slot (e.g., axial slots 633 and 635) that opens onto an outer edge 602 of the electrode 612. As described above, each flexural hinge of the plurality of flexural hinges could include at least one circular opening (e.g., circular openings 610a and 610b) and at least one alley opening (e.g., alley opening 620a and 620b). The at least one alley opening includes a radial slot in electrode 612 that couples the at least one circular opening with the at least one axial vent opening. In an example embodiment, the axial flexural hinge may resemble an "S-shape". It will be understood that other arrangements and sizes of openings are contemplated herein.

Figure 6C:
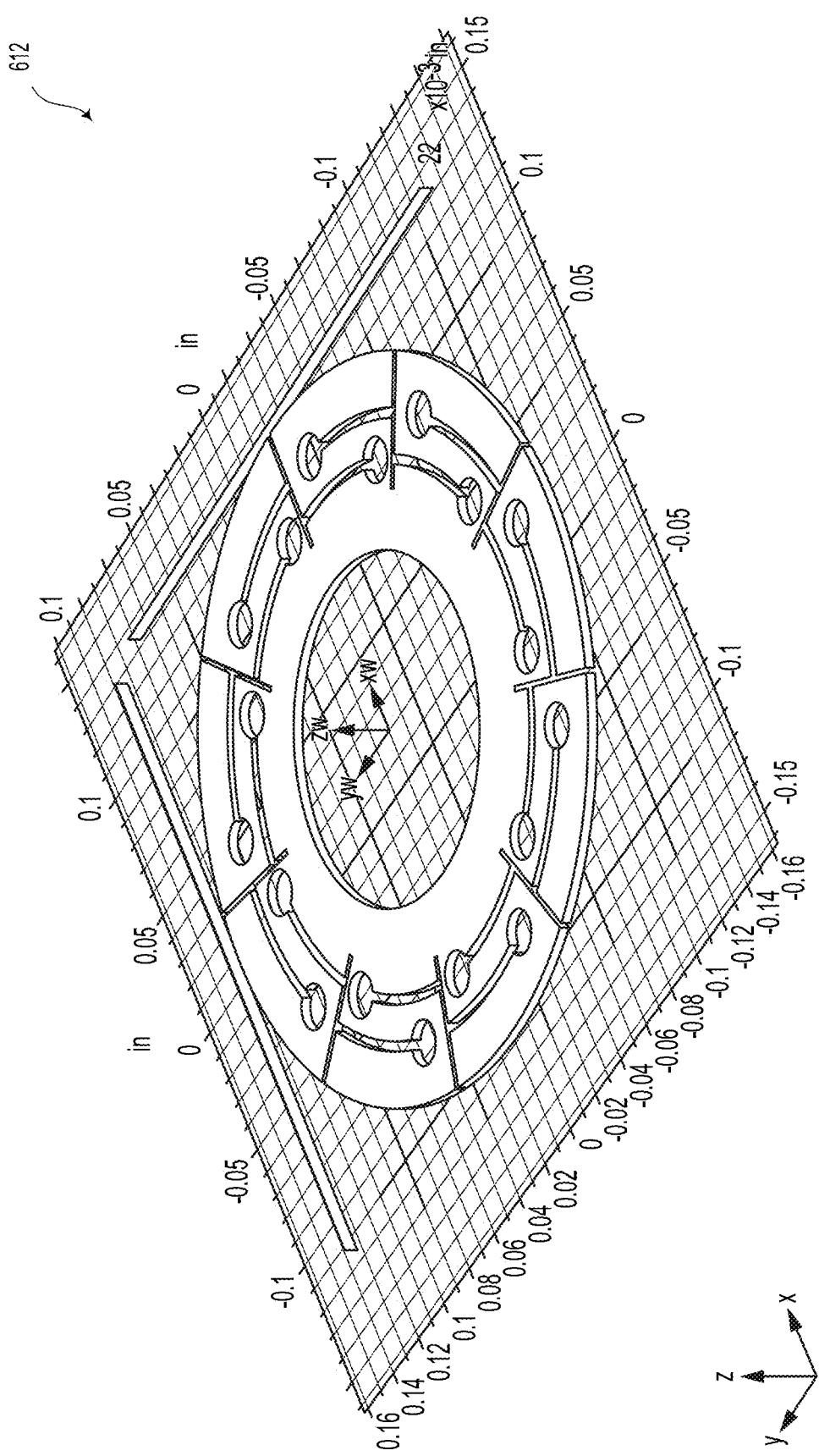
FIG. 6C illustrates an electrode, according to an example implementation.

FIG. 6C illustrates an electrode 612, according to an example implementation. FIG. 6C includes an oblique angle view of electrode 612, which could include similar or identical elements corresponding to those illustrated and described in reference to FIG. 6B.

Figure 6D:
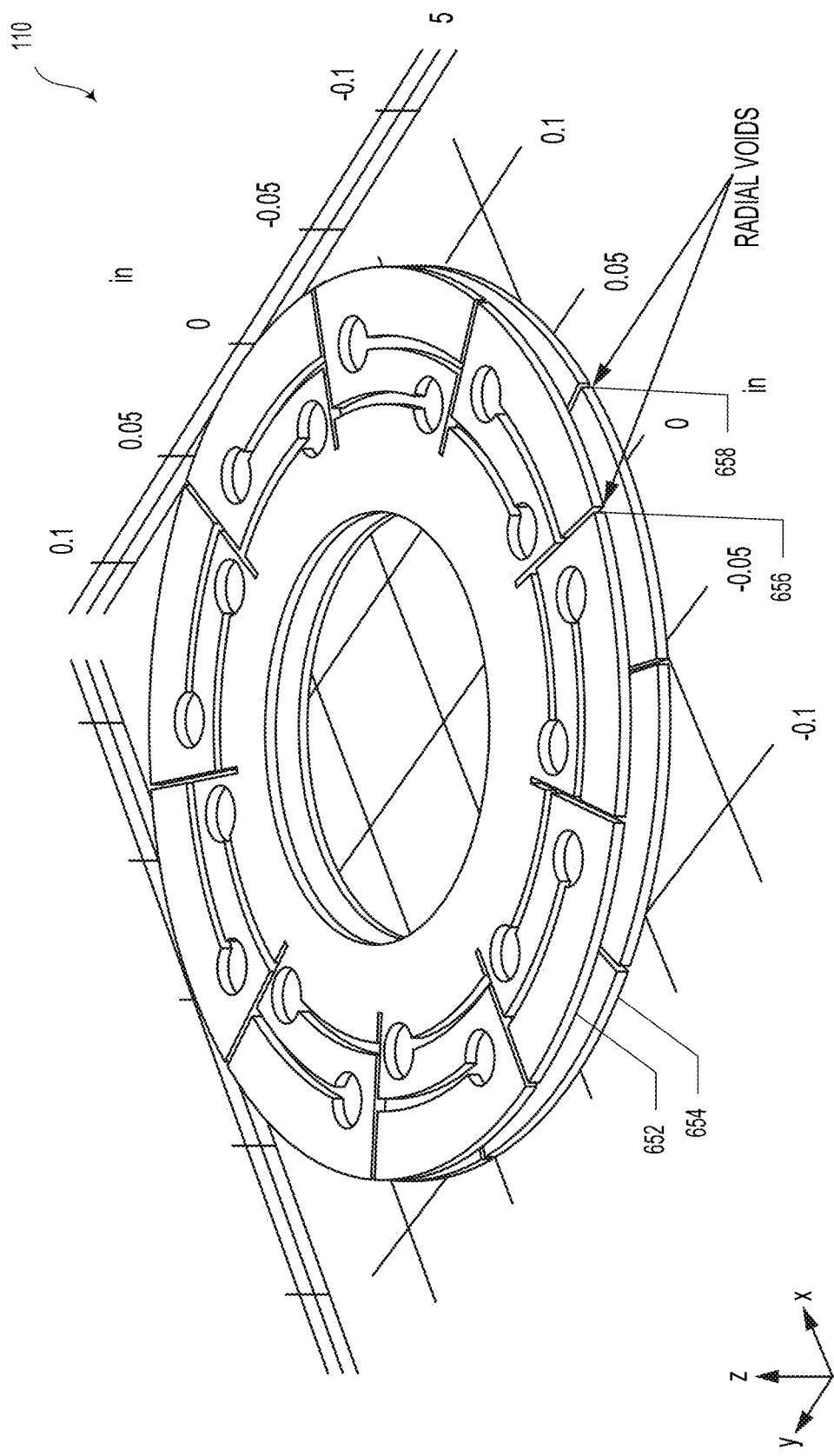
FIG. 6D illustrates a pair of electrodes, according to an example implementation.

FIG. 6D illustrates an electrode array 110, according to an example implementation. Namely, the electrode array 110 includes a first electrode 652 and a second electrode 654. The first electrode 652 and the second electrode 654 each include a plurality of axial vent openings (e.g., axial vent opening 656 and 658).

In an example embodiment, the first electrode 652 and the second electrode 654 could include a plurality of unit cells. As illustrated, the first electrode 652 and the second electrode 654 each include nine unit cells. Accordingly, each unit cell accounts for 40 degrees of angular range with respect to a central axis of the respective electrodes. Furthermore, the first electrode 652 and the second electrode 654 could be offset in angular position such that their axial vent openings do not align along a vertical axis. As an example, some embodiments may include the first electrode 652 being offset by 20 degrees so that the axial vent openings (656 and 658) do not align. Other angular offset values and other rotational arrangements are possible and contemplated.

Figure 6E:
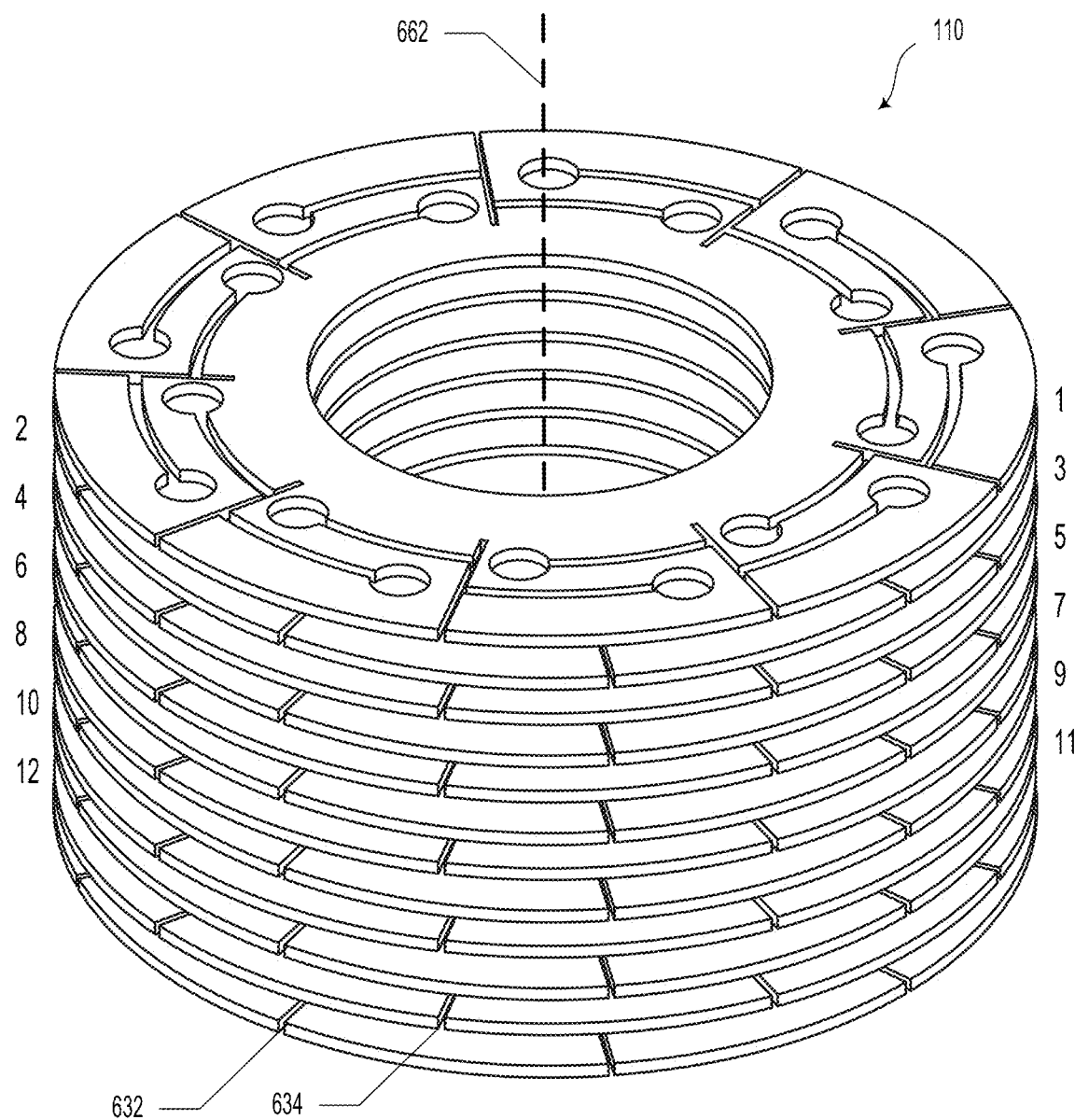
FIG. 6E illustrates an electrode array, according to an example implementation.

FIG. 6E illustrates an electrode array 110, according to an example implementation. The electrode array 110 includes a plurality of electrodes (e.g., electrode 612 or electrodes 122 or 132) in a stacked, interdigitated arrangement, as described elsewhere herein. Furthermore, the plurality of electrodes could include axial vent openings (e.g., axial vent openings 424 and 434) that are offset from one electrode to the next with respect to an angle about the central axis 662.

While FIG. 6E illustrated an electrode array 110 with a constant radius, other electrode array shapes are considered. As an example, an alternative electrode array could include a plurality of electrodes with increasing or decreasing radii, which may form a "Christmas tree" shape. Alternatively, the electrode array may include electrodes with two different radii, so as to resemble a "stair-step" in cross-section. Other variable-radius electrode arrays are possible and contemplated herein.

Furthermore, it will be understood that the dimensions of the electrode array 110 may vary based on the dimensions of the hole or surface the electrode array will be treating. For example, the electrode array may have various diameters that may correspond to various hole diameters (e.g., 1 mm to 50 mm or greater). Furthermore, the electrode array may include various numbers of electrodes and/or variable electrode spacing to account for differences in hole depth. In an example embodiment, the electrode array could be 10 mm to 100 mm or greater in length. Other electrode array dimensions are possible and contemplated herein.

Figure 7:
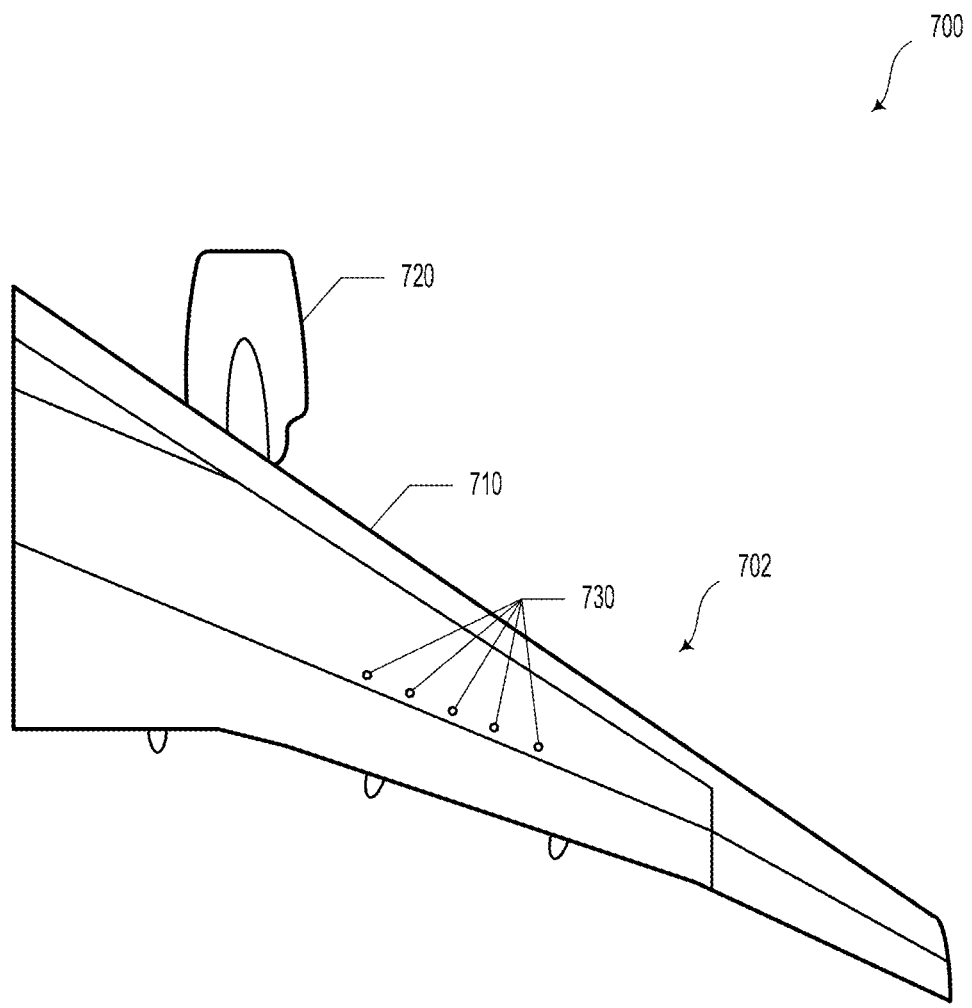
FIG. 7 illustrates an aircraft component, according to an example implementation.

FIG. 7 illustrates an aircraft component 700, according to an example implementation. While the aircraft component 700 includes structures 702 such as an aircraft wing portion 710 and an aircraft engine 720, other types of aircraft components are possible and contemplated herein. For example, aircraft component 700 could additionally or alternatively include wing surfaces, control surfaces, structure support structures, connectors, fasteners, wires, insulators, semiconductors, carbon-based materials, and/or any other structural or mechanical material that could be modified by the Joule heating process described herein. Namely, the aircraft component 700 could be formed, at least in part, by CFRP and/or other composite materials.

In some example embodiments, the aircraft component 700 could include holes 730 in the CFRP. The holes 730 could include other types of openings or surfaces in the CFRP material, include slots, cuts, folds, sidewalls, ply ends, among other possibilities. In such examples, the holes 730 have been treated by a Joule heating process, similar or identical to that described elsewhere herein. Namely, the Joule heating process could include providing an electrode array (e.g., electrode array 110 as illustrated and described in reference to FIG. 1). The electrode array includes a first electrode set (e.g., first electrode set 120) and a second electrode set (e.g., second electrode set 130). The first electrode set and the second electrode set each comprise one or more disk-shaped electrodes (e.g., electrode(s) 122 and 132).

In such examples, the respective electrodes of the first electrode set and the second electrode set are arranged in an interdigitated, concentric stack about a central axis. The first electrode set is electrically-connected to a first terminal of a current source (e.g., current source 140 as illustrated and described in reference to FIG. 1). The second electrode set is electrically-connected to a second terminal of the current source.

The Joule heating process could include causing the electrode array to contact the CFRP such that at least a portion of the CFRP is in contact with an outer edge of at least one electrode of the first electrode set and an outer edge of at least one electrode of the second electrode set. That is, the CFRP could form an electrical connection between the first electrode set and the second electrode set.

The Joule heating process may also include causing the current source to provide electrical current through the first electrode set and the second electrode set so as to heat at least the portion of the CFRP. As described herein, the Joule heating process could be performed on various surfaces and/or parts so as to modify their electrical and/or mechanical properties. In example embodiments, the Joule heating process could be applied to the holes in the CFRP so as to provide electrical characteristics that are more isotropic and/or homogeneous throughout the CFRP structure around the hole. Such modification of the electrical characteristics using Joule heating may provide improved lightning resistance for aircraft, among other benefits.

III. Example Methods

Figure 8:
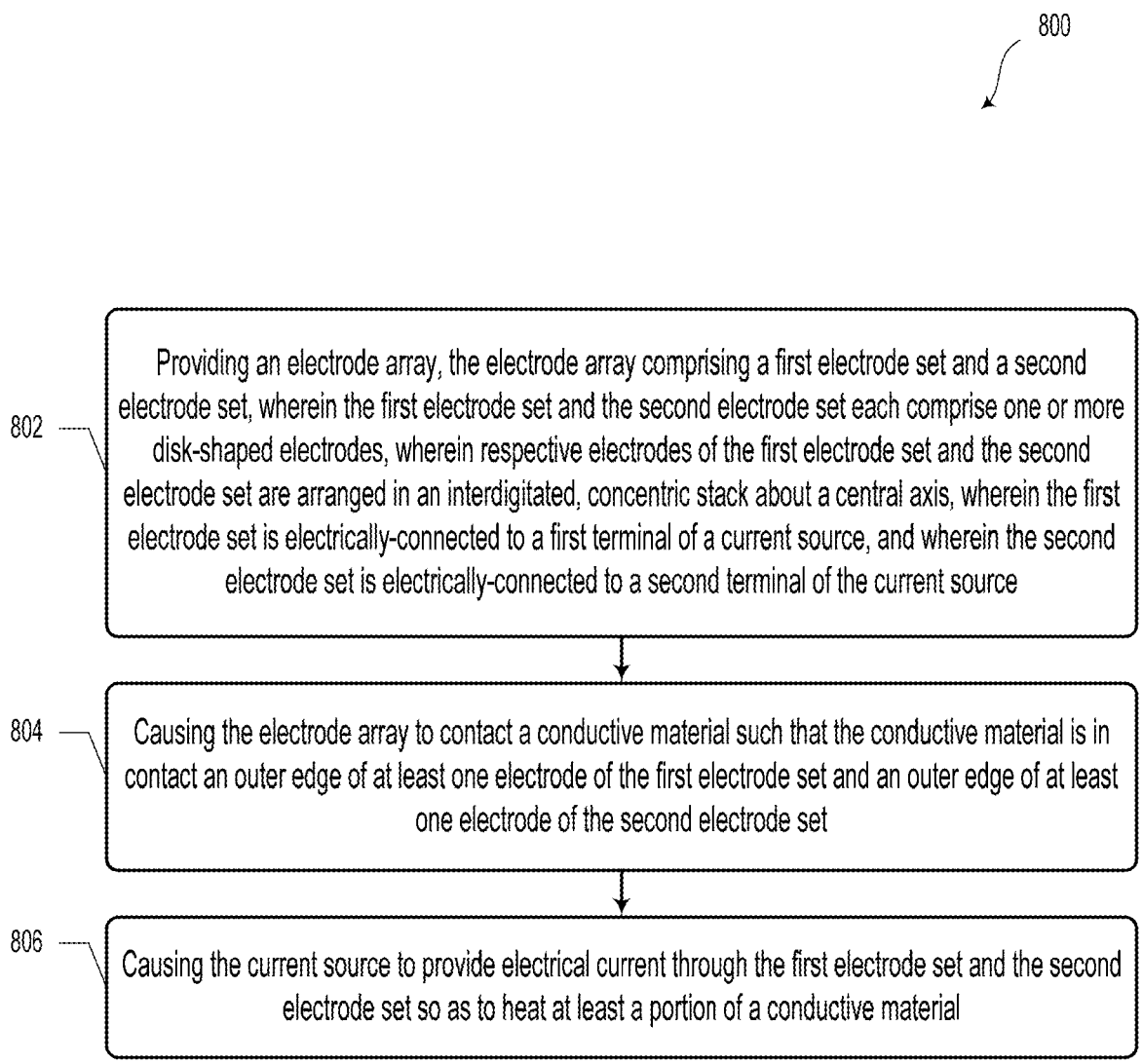
FIG. 8 illustrates a method, according to an example implementation.

FIG. 8 illustrates a method 800, according to an example implementation. Method 800 may involve elements of system 100 as illustrated and described in reference to FIGS. 1 and 2. Additionally or alternatively, some or all elements of method 800 may relate to elements of FIGS. 3, 4, 5A-5C, 6A-6E, and/or 7. While FIG. 8 illustrates certain blocks or steps as following a specific order, it will be understood that some blocks or steps could be omitted and that other blocks or steps could be included. Furthermore, the blocks or steps could be carried out in a different order.

Block 802 includes providing an electrode array (e.g., electrode array 110 as illustrated and described in reference to FIG. 1). Providing the electrode array could include, for example, an aircraft component supplier could manufacture and/or deliver the electrode array to an end user for assembly. In some embodiments, the end user could be an aircraft manufacturer or another type of vehicle assembler.

The electrode array includes a first electrode set (e.g., first electrode set 120) and a second electrode set (e.g., second electrode set 130). The first electrode set and the second electrode set each include one or more disk-shaped electrodes (e.g., electrodes 122 and 132). The respective electrodes of the first electrode set and the second electrode set are arranged in an interdigitated, concentric stack about a central axis. The first electrode set is electrically-connected to a first terminal of a current source (e.g., current source 140). The second electrode set is electrically-connected to a second terminal of the current source.

Block 804 includes causing the electrode array to contact a conductive material (e.g., conductive material 160) such that the conductive material is in contact with an outer edge of at least one electrode of the first electrode set and an outer edge of at least one electrode of the second electrode set. It will be understood that block 804 could be performed by a worker, a robot, or performed automatically (e.g., along an assembly line). In an example embodiment, causing the electrode array to contact the conductive material could include the electrode array being mounted to a hand-held or robot-mounted tool. In such scenarios, contacting the electrode array to the conductive material could include moving the tool so as to contact the conductive material. In some embodiments, the electrode array could be introduced into a hole drilled or otherwise formed in the conductive material. Specifically, in the case of CFRP parts, the electrode array could be brought into contact with an edge of, or hole within, the conductive CFRP material. In some embodiments, the edge (or hole) may include different electrical conductivity properties than those of bulk or sheet CFRP.

Block 806 includes causing the current source to provide electrical current through the first electrode set and the second electrode set so as to heat at least a portion of a conductive material. In some embodiments, causing the current source to provide electrical current could include a controller (e.g., controller 150) to execute instructions stored in memory with one or more processors. The instructions could include, for example, switching on a current source (e.g., current source 140), a voltage source, or another type of power supply. The electrical current provided by the current source could include a DC or AC current. Furthermore, the electrical current could be provided at a predetermined current level and/or according to a predetermined variable current profile (e.g., current ramp up/down, exponential increase, stepwise current increase/decrease, etc.). In some embodiments, the method could additionally include switching off the current source and/or controlling the current source to provide the electrical current within a predetermined current range. In some embodiments, the predetermined current level and/or current ranges could include electrical currents within the range of 1 milliamp to 10 amps or more.

In cases where a voltage source is utilized, voltages within the range of 1 mV to 500 V or more may be applied to the electrodes. In some embodiments, the applied voltage may be practically limited by an air and/or resin matrix dielectric breakdown voltage (DBV). For example, electrodes separated by a 200 micron-thick insulating layer may exhibit an air DBV of approximately 600 V at sea level. The resin matrix may have a DBV of approximately three times that of air. It will be understood that electrical currents and/or voltages may be based on a size of the work piece, a size of the hole, etc. Furthermore, electrical currents and voltages outside the specifically-described ranges are possible and contemplated.

In some embodiments, method 800 may include drilling a hole in a structure comprising carbon fiber reinforced polymer (CFRP). In some embodiments, a worker could drill the hole in CFRP using a carbide bit or another type of drill bit. Additionally or alternatively, a robot or another type of machine could perform the drilling in the CFRP. While a "hole" could include an opening that passes completely through a workpiece (e.g., a through-hole in a multi-ply portion of CFRP), it will be understood that a "hole" could additionally or alternatively include a depression, an indentation, or a partially-drilled opening in CFRP. That is the "hole" need not pass completely through the workpiece. In such scenarios, causing the electrode array to contact a conductive material may include inserting the electrode array into the hole.

In example embodiments, causing the current source to provide electrical current through the first electrode set and the second electrode set may include Joule heating the portion of the conductive material so as to eliminate or vaporize at least a portion of resin from the CFRP. That is, the Joule heating could include an electrical current that passes through the first electrode set to the conductive material and then to the second electrode set, or in the reverse order. Such an electrical current could cause a portion of the conductive material to become hot and/or cause constituent materials (e.g., resin) to melt and/or outgas. In such situations, Joule heating the CFRP may include forming a more-uniformly conductive surface along an inner surface of the hole or otherwise modifying the conductivity and/or other material properties of the inner surface of the hole.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system comprising:
an electrode array comprising a first electrode set and a second electrode set, wherein the first electrode set and the second electrode set each comprise one or more disk-shaped electrodes, wherein respective electrodes of the first electrode set and the second electrode set are arranged in an interdigitated, concentric stack about a central axis;
- a current source, wherein a first terminal of the current source is electrically-coupled to the first electrode set and wherein a second terminal of the current source is electrically-coupled to the second electrode set; and
- a controller configured to:
  - cause the current source to provide electrical current through the first electrode set and the second electrode set so as to heat at least a portion of an electrically conductive material of a workpiece present between an outer edge of at least one electrode of the first electrode set and an outer edge of at least one electrode of the second electrode set.

2. The system of claim 1, wherein the interdigitated, concentric stack comprises an alternating stack of the respective electrodes of the first electrode set and the second electrode set, wherein each electrode of the first electrode set is immediately adjacent to at least one electrode of the second electrode set, and vice versa.

3. The system of claim 1, wherein neighboring electrodes of the electrode array are separated by an electrically insulating layer, wherein the electrically insulating layer has a thickness of at least 5 millimeters.

4. The system of claim 3, wherein the electrically insulating layer comprises at least one of: air, polyethylene, polystyrene, biaxially-oriented polyethylene terephthalate, or polytetrafluoroethylene.

5. The system of claim 1, wherein the respective electrodes comprise at least one of steel or titanium.

6. The system of claim 1, wherein the respective electrodes comprise at least one axial vent opening, wherein the at least one axial vent opening comprises a notch along an outer edge of the respective electrode.

7. The system of claim 6, wherein each electrode of the first electrode set and the second electrode set comprise a plurality of axial vent openings spaced at regular angular intervals, and wherein a relative position of the axial vent openings of the first electrode set is different in radial angle from those of the second electrode set.

8. The system of claim 1, wherein the respective electrodes comprise a plurality of planar flexural hinges.

9. The system of claim 8, wherein the plurality of flexural hinges is configured to allow compressive movement of an outer edge of the respective electrode with respect to the central axis.

10. The system of claim 8, wherein each flexural hinge of the plurality of flexural hinges comprises at least one circular opening, at least one alley opening, and at least one axial vent opening, wherein the at least one axial vent opening comprises an axial slot that opens onto an outer edge of the respective electrode, wherein the at least one alley opening comprises a radial slot in the respective electrode that couples the at least one circular opening with the at least one axial vent opening.

11. The system of claim 1, wherein the respective electrodes comprise a central opening, wherein the central opening is arranged about the central axis.

12. The system of claim 11, further comprising a first bus connection and a second bus connection, wherein the first bus connection provides an electrical connection between first electrode set and the first terminal of the current source through the central opening, and wherein the second bus connection provides an electrical connection between the second electrode set and the second terminal of the current source through the central opening.

13. The system of claim 1, wherein the electrically conductive material comprises carbon fiber reinforced polymer (CFRP) material, wherein causing the current source to provide electrical current through the first electrode set and the second electrode set comprises applying Joule heating to the CFRP material to vaporize or eliminate at least a portion of resin from the CFRP material present between the outer edge of the at least one electrode of the first electrode set and the outer edge of the at least one electrode of the second electrode set.

14. The system of claim 13, wherein applying Joule heating to the CFRP material forms an electrically conductive surface along a surface of the CFRP material.

15. A method comprising:
- providing an electrode array, the electrode array comprising a first electrode set and a second electrode set, wherein the first electrode set and the second electrode set each comprise one or more disk-shaped electrodes, wherein respective electrodes of the first electrode set and the second electrode set are arranged in an interdigitated, concentric stack about a central axis, wherein the first electrode set is electrically-connected to a first terminal of a current source, and wherein the second electrode set is electrically-connected to a second terminal of the current source;
- causing the electrode array to contact an electrically conductive material of a workpiece such that the electrically conductive material is in contact with an outer edge of at least one electrode of the first electrode set and an outer edge of at least one electrode of the second electrode set; and
- causing the current source to provide electrical current through the first electrode set and the second electrode set so as to heat at least a portion of the electrically conductive material.

16. The method of claim 15, further comprising:
- drilling a hole in the workpiece, wherein the electrically conductive material comprises carbon fiber reinforced polymer (CFRP).

17. The method of claim 16, wherein causing the electrode array to contact the electrically conductive material comprises inserting the electrode array into the hole.

18. The method of claim 17, wherein causing the current source to provide electrical current through the first electrode set and the second electrode set comprises Joule heating the portion of the electrically conductive material so as to eliminate or vaporize at least a portion of resin from the CFRP.

19. The method of claim 18, wherein Joule heating the CFRP comprises forming an electrically conductive surface along an inner surface of the hole.

20. An aircraft component comprising:
- structures comprising an electrically conductive material, wherein the electrically conductive material comprises carbon fiber reinforced polymer (CFRP), wherein the structures comprise holes in the CFRP, wherein the holes have been treated by a Joule heating process, the Joule heating process including:
  - providing an electrode array, the electrode array comprising a first electrode set and a second electrode set, wherein the first electrode set and the second electrode set each comprise one or more disk-shaped electrodes, wherein respective electrodes of the first electrode set and the second electrode set are arranged in an interdigitated, concentric stack about a central axis, wherein the first electrode set is electrically-connected to a first terminal of a current source, and wherein the second electrode set is electrically-connected to a second terminal of the current source;

causing the electrode array to contact the CFRP such that at least a portion of the CFRP is in contact with an outer edge of at least one electrode of the first electrode set and an outer edge of at least one electrode of the second electrode set; and causing the current source to provide electrical current through the first electrode set and the second electrode set so as to heat at least the portion of the CFRP.

\* \* \* \* \*